United States Patent
Horn et al.

(10) Patent No.: US 11,877,273 B2
(45) Date of Patent: Jan. 16, 2024

(54) TONE RESERVATION SIGNALING OUTSIDE OF AN ALLOCATED BANDWIDTH

(71) Applicant: QUALCOMM Incorporated, San Diego, CA (US)

(72) Inventors: Idan Michael Horn, Hod Hasharon (IL); Shay Landis, Hod Hasharon (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 70 days.

(21) Appl. No.: 17/353,357

(22) Filed: Jun. 21, 2021

(65) Prior Publication Data

US 2022/0408440 A1    Dec. 22, 2022

(51) Int. Cl.
| | |
|---|---|
| *H04W 72/0453* | (2023.01) |
| *H04W 72/1268* | (2023.01) |
| *H04L 27/26* | (2006.01) |

(52) U.S. Cl.
CPC ..... *H04W 72/0453* (2013.01); *H04L 27/2614* (2013.01); *H04W 72/1268* (2013.01)

(58) Field of Classification Search
CPC .......... H04W 72/0453; H04W 72/1268; H04L 27/2614
See application file for complete search history.

(56) References Cited

U.S. PATENT DOCUMENTS

| | | | | |
|---|---|---|---|---|
| 9,008,223 | B1* | 4/2015 | Tamma | H04L 25/08 |
| | | | | 375/295 |
| 10,863,437 | B1* | 12/2020 | Noh | H04L 27/2603 |
| 2007/0071120 | A1* | 3/2007 | Talwar | H04L 27/2614 |
| | | | | 375/260 |
| 2008/0002779 | A1* | 1/2008 | Carsello | H04L 27/2624 |
| | | | | 375/260 |
| 2018/0278452 | A1* | 9/2018 | Yang | H04B 1/0071 |
| 2021/0022044 | A1* | 1/2021 | Zhang | H04L 5/001 |
| 2021/0377813 | A1* | 12/2021 | Landis | H04W 72/0453 |
| 2021/0409251 | A1* | 12/2021 | Yang | H04L 27/2618 |
| 2022/0014410 | A1* | 1/2022 | Nguyen | H04L 27/2618 |
| 2022/0022236 | A1* | 1/2022 | Li | H04W 52/365 |
| 2022/0132482 | A1* | 4/2022 | Gokceli | H04W 72/044 |
| 2022/0278882 | A1* | 9/2022 | Back | H04L 27/2614 |

\* cited by examiner

*Primary Examiner* — Yu-Wen Chang
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, an indication to transmit tone reservation signaling, configured to reduce a peak-to-average-power-ratio for one or more of the UE or the base station, on one or more subcarriers outside of an allocated bandwidth that is allocated for an uplink communication scheduled for the UE. The UE may transmit, to the base station, signaling that includes the uplink communication within the allocated bandwidth and the tone reservation signaling on the one or more subcarriers. Numerous other aspects are provided.

30 Claims, 9 Drawing Sheets

TONE RESERVATION SIGNALING OUTSIDE OF AN ALLOCATED BANDWIDTH

FIELD OF THE DISCLOSURE

Aspects of the present disclosure generally relate to wireless communication and specifically, to techniques and apparatuses for tone reservation signaling outside of an allocated bandwidth.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDMA (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

A receiving wireless communication device may have limitations for receiving signals from a transmitting wireless communication device based at least in part on components of the receiving wireless communication device. For example, when a peak-to-average-power ratio (PAPR) is too high for the components of the receiving wireless communication device, the components may be unable to decode signals (for example, based at least in part on saturation of the signals). In a communication where tone reservation is not used, an increase in PAPR may occur, which may degrade communications between the base station and the UE, and may negatively affect an efficiency of power amplification at the base station. Based at least in part on degradation of the communications, the UE or the base station may consume power, communication, network, and computing resources to detect or correct communication errors associated with the degradation.

SUMMARY

Some aspects described herein relate to a method of wireless communication performed by a user equipment (UE). The method may include receiving, from a base station, an indication to transmit tone reservation signaling, configured to reduce a peak-to-average-power-ratio for one or more of the UE or the base station, on one or more subcarriers outside of an allocated bandwidth that is allocated for an uplink communication scheduled for the UE. The method may include transmitting, to the base station, signaling that includes the uplink communication within the allocated bandwidth and the tone reservation signaling on the one or more subcarriers.

Some aspects described herein relate to a method of wireless communication performed by a base station. The method may include receiving, from a first UE, an indication of a channel response associated with a first uplink channel that has a bandwidth allocated to the first UE. The method may include transmitting, to a second UE, an indication that one or more subcarriers, of the bandwidth allocated to the first UE, support transmission of tone reservation signaling by the second UE based at least in part on the indication of the channel response associated with the first uplink channel.

Some aspects described herein relate to a UE for wireless communication. The user equipment may include at least one processor and at least one memory, communicatively coupled with the at least one processor, that stores processor-readable code. The processor-readable code, when executed by the at least one processor, may be configured to cause the user equipment to receive, from a base station, an indication to transmit tone reservation signaling, configured to reduce a peak-to-average-power-ratio for one or more of the UE or the base station, on one or more subcarriers outside of an allocated bandwidth that is allocated for an uplink communication scheduled for the UE. The processor-readable code, when executed by the at least one processor, may be configured to cause the user equipment to transmit, to the base station, signaling that includes the uplink communication within the allocated bandwidth and the tone reservation signaling on the one or more subcarriers.

Some aspects described herein relate to a base station for wireless communication. The base station may include at least one processor and at least one memory, communicatively coupled with the at least one processor, that stores processor-readable code. The processor-readable code, when executed by the at least one processor, may be configured to cause the base station to receive, from a first UE, an indication of a channel response associated with a first uplink channel having a bandwidth allocated to the first UE. The processor-readable code, when executed by the at least one processor, may be configured to cause the base station to transmit, to a second UE, an indication that one or more subcarriers, of the bandwidth allocated to the first UE, support transmission of tone reservation signaling by the second UE based at least in part on the indication of the channel response associated with the first uplink channel.

Some aspects described herein relate to a non-transitory computer-readable medium that stores a set of instructions for wireless communication by a UE. The set of instructions, when executed by one or more processors of the UE, may cause the UE to receive, from a base station, an indication to transmit tone reservation signaling, configured to reduce a peak-to-average-power-ratio for one or more of the UE or the base station, on one or more subcarriers outside of an allocated bandwidth that is allocated for an uplink communication scheduled for the UE. The set of instructions, when executed by one or more processors of the UE, may cause the UE to transmit, to the base station, signaling that includes the uplink communication within the allocated bandwidth and the tone reservation signaling on the one or more subcarriers.

Some aspects described herein relate to a non-transitory computer-readable medium that stores a set of instructions for wireless communication by a base station. The set of instructions, when executed by one or more processors of the base station, may cause the base station to receive, from a first UE, an indication of a channel response associated with a first uplink channel that has a bandwidth allocated to the first UE. The set of instructions, when executed by one or more processors of the base station, may cause the base station to transmit, to a second UE, an indication that one or more subcarriers, of the bandwidth allocated to the first UE, support transmission of tone reservation signaling by the second UE based at least in part on the indication of the channel response associated with the first uplink channel.

Some aspects described herein relate to an apparatus for wireless communication. The apparatus may include means for receiving, from a base station, an indication to transmit tone reservation signaling, configured to reduce a peak-to-average-power-ratio for one or more of the apparatus or the base station, on one or more subcarriers outside of an allocated bandwidth that is allocated for an uplink communication scheduled for the apparatus. The apparatus may include means for transmitting, to the base station, signaling that includes the uplink communication within the allocated bandwidth and the tone reservation signaling on the one or more subcarriers.

Some aspects described herein relate to an apparatus for wireless communication. The apparatus may include means for receiving, from a first UE, an indication of a channel response associated with a first uplink channel that has a bandwidth allocated to the first UE. The apparatus may include means for transmitting, to a second UE, an indication that one or more subcarriers, of the bandwidth allocated to the first UE, support transmission of tone reservation signaling by the second UE based at least in part on the indication of the channel response associated with the first uplink channel.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
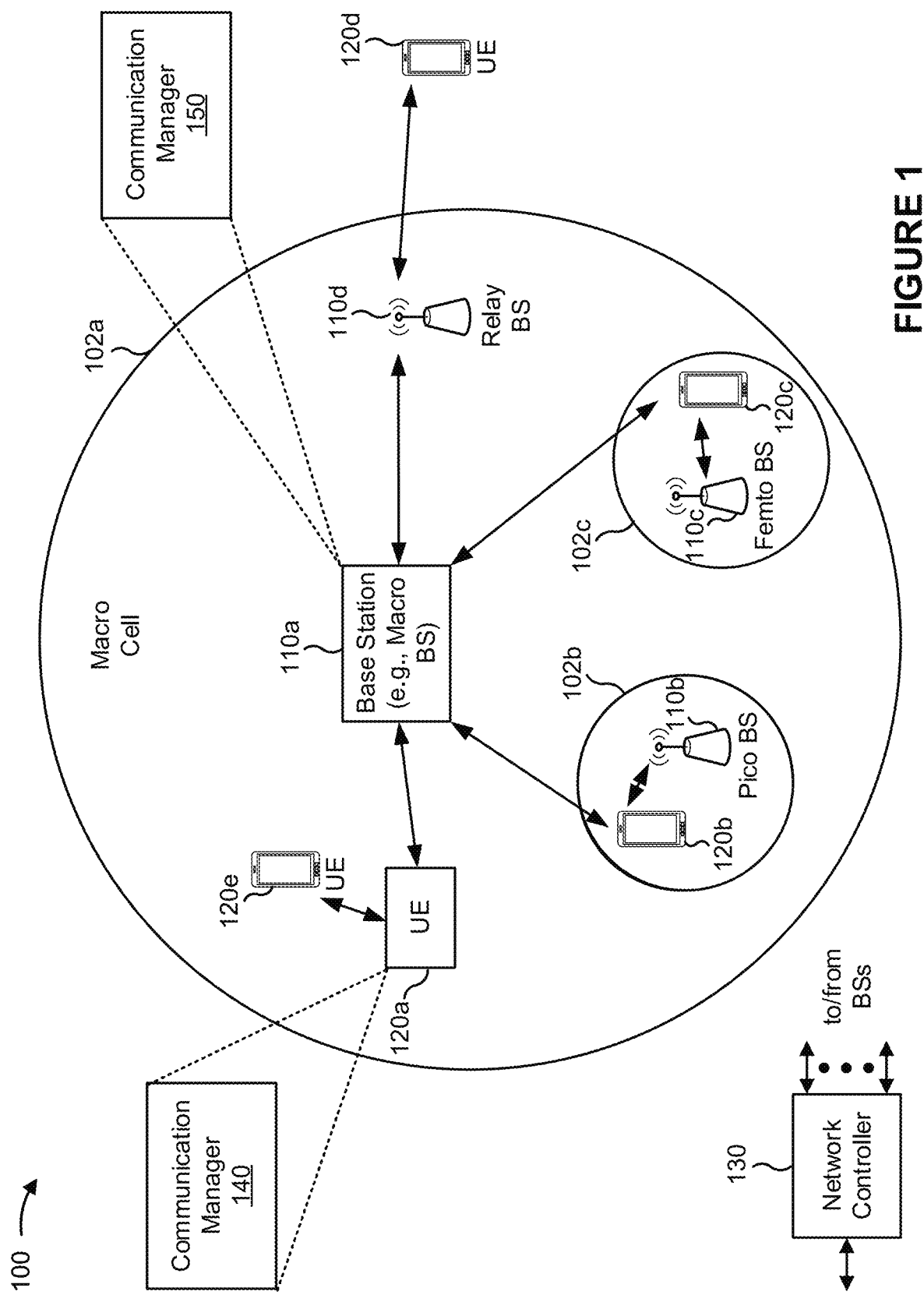
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to transmitting tone reservation signaling outside of an allocated bandwidth that is allocated for a communication. Some aspects more specifically relate to an uplink channel associated with a first UE having one or more low energy subcarriers and a second UE transmitting tone reservation signaling on the one or more low energy subcarriers in the uplink channel associated with the first UE. In some aspects, a base station may receive signaling (for example, uplink reference signals or an indication of a downlink channel) that indicates a channel response of the uplink channel that is associated with the first UE. The base station may identify subcarriers, within the uplink channel, that may be used for tone reservation. For example, the base station may identify low energy subcarriers, within the uplink channel, on which tone reservation signaling may be transmitted. The tone reservation signaling may be used to increase the energies of the low energy subcarriers as received by the base station, which may improve a PAPR for the base station when receiving uplink communications, from the first UE, via the uplink channel. The tone reservation signaling may be transmitted with a power level that is high enough to improve the PAPR and low enough avoid interference with the uplink communication. The base station may transmit an indication to the second UE to transmit the tone reservation signaling on the identified subcarriers of the uplink channel associated with the first UE.

Particular aspects of the subject matter described in this disclosure can be implemented to realize one or more of the following potential advantages. In some examples, the described techniques can be used to improve a PAPR of an uplink communication transmitted by the first UE by having a second UE transmit tone reservation signaling on low energy subcarriers of an uplink channel used by the first UE to transmit the uplink communication. An improved PAPR may reduce reception errors and computing, network, communication, and power resources consumed to detect and correct the reception errors.

FIG. 1 is a diagram illustrating an example of a wireless network in accordance with the present disclosure. The wireless network may be or may include elements of a 5G (NR) network or an LTE network, among other examples. The wireless network may include one or more base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP), among other examples. Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). ABS for a macro cell may be referred to as a macro BS. A BS for a pico cell may be referred to as a pico BS. ABS for a femto cell may be referred to as a femto BS or a home BS. ABS may support one or multiple (for example, three) cells.

The wireless network may be a heterogeneous network that includes BSs of different types, such as macro BSs, pico BSs, femto BSs, or relay BSs. These different types of BSs may have different transmit power levels, different coverage areas, and different impacts on interference in the wireless network. For example, macro BSs may have a high transmit power level (for example, 5 to 40 watts) whereas pico BSs, femto BSs, and relay BSs may have lower transmit power levels (for example, 0.1 to 2 watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network through various types of backhaul interfaces, such as a direct physical connection or a virtual network, using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay, among other examples.

UEs 120 (for example, 120a, 120b, 120c) may be dispersed throughout the wireless network, and each UE may be stationary or mobile. A UE may also be referred to as an access terminal, a terminal, a mobile station, a subscriber unit, or a station, among other examples. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors or location tags, among other examples, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components or memory components, among other examples.

In general, any quantity of wireless networks may be deployed in a given geographic area. Each wireless network may support a particular radio access technology (RAT) and may operate on one or more frequencies or frequency channels. A frequency may also be referred to as a carrier among other examples. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol or a vehicle-to-infrastructure (V2I) protocol), a mesh network, or a combination thereof. In such examples, the UE 120 may perform scheduling operations, resource selection operations, or other operations described elsewhere herein as being performed by the base station 110.

Devices of the wireless network may communicate using the electromagnetic spectrum, which may be subdivided based on frequency or wavelength into various classes, bands, or channels. For example, devices of the wireless network may communicate using an operating band having a first frequency range (FR1), which may span from 410 MHz to 7.125 GHz. As another example, devices of the wireless network may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" may broadly represent frequencies less than 6 GHz, frequencies within FR1, mid-band frequencies (for example, greater than 7.125 GHz), or a combination thereof. Similarly, unless specifically stated otherwise, it should be understood that the term "millimeter wave" may broadly represent frequencies within the EHF band, frequencies within FR2, mid-band frequencies (for example, less than 24.25 GHz), or a combination thereof. The frequencies included in FR1 and FR2 may be modified, and techniques described herein are applicable to those modified frequency ranges.

In some aspects, the UE 120 may include a communication manager 140. As described in more detail elsewhere herein, the communication manager 140 may receive, from a base station, an indication to transmit tone reservation signaling, configured to reduce a peak-to-average-power-ratio for one or more of the UE or the base station, on one or more subcarriers outside of an allocated bandwidth that is allocated for an uplink communication scheduled for the UE; and transmit, to the base station, signaling that includes the uplink communication within the allocated bandwidth and the tone reservation signaling on the one or more subcarriers. Additionally, or alternatively, the communication manager 140 may perform one or more other operations described herein.

In some aspects, the base station 110 may include a communication manager 150. As described in more detail elsewhere herein, the communication manager 150 may receive, from a first UE, an indication of a channel response associated with a first uplink channel that has a bandwidth allocated to the first UE; and transmit, to a second UE, an indication that one or more subcarriers, of the bandwidth allocated to the first UE, support transmission of tone reservation signaling by the second UE based at least in part on the indication of the channel response associated with the first uplink channel. Additionally, or alternatively, the communication manager 150 may perform one or more other operations described herein.

Figure 2:
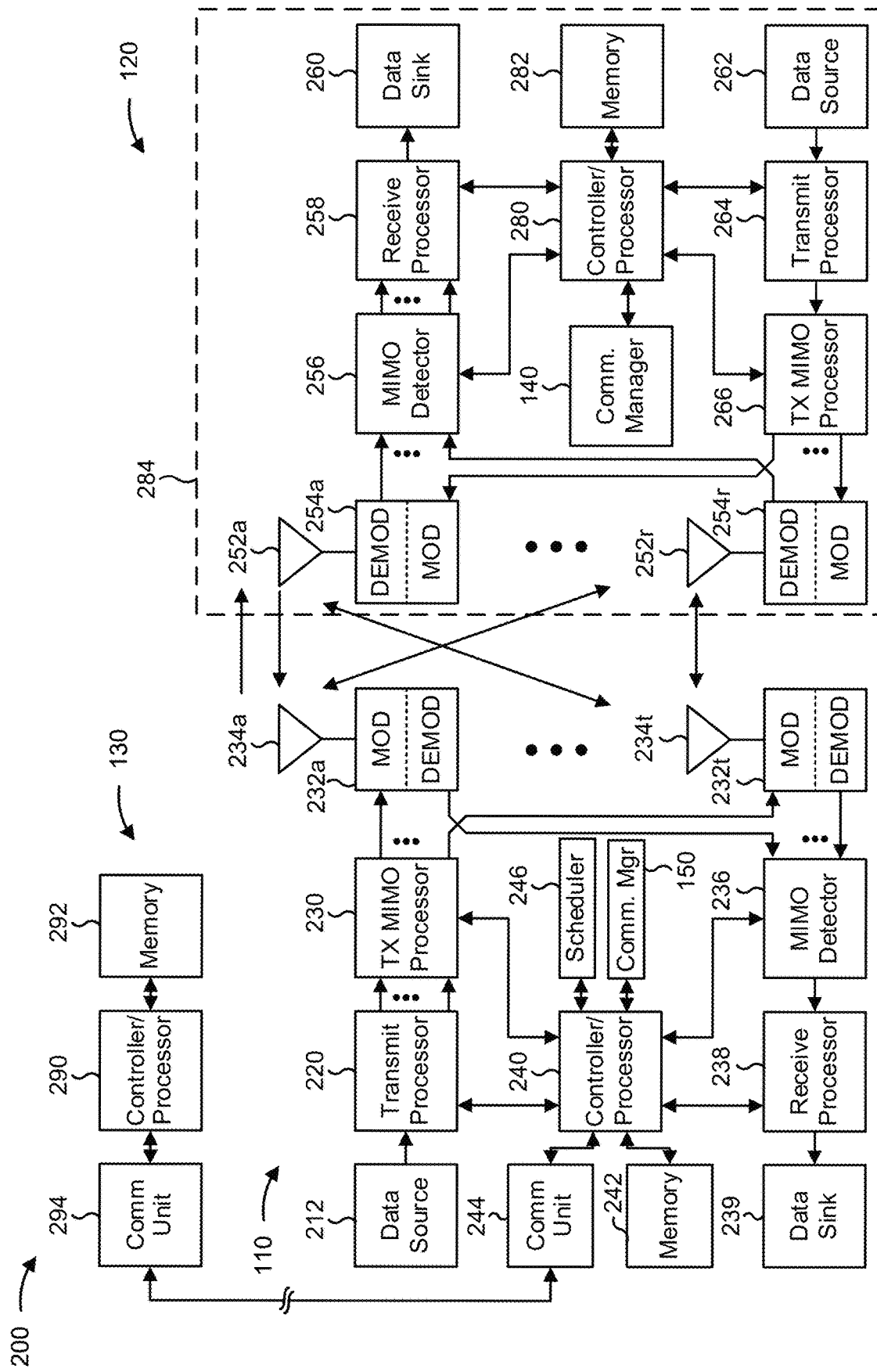
FIG. 2 is a diagram illustrating an example base station (BS) in communication with a UE in a wireless network in accordance with the present disclosure.

FIG. 2 is a diagram illustrating an example base station in communication with a UE in a wireless network in accordance with the present disclosure. The base station may correspond to base station 110 of FIG. 1. Similarly, the UE may correspond to UE 120 of FIG. 1.

Base station 110 may be equipped with T antennas 234a through 234t, and UE 120 may be equipped with R antennas 252a through 252r, where in general T≥1 and R≥1. At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) among other examples) and control information (for example, CQI requests, grants, or upper layer signaling) and provide overhead symbols and control symbols. Transmit processor 220 may also generate reference symbols for reference signals and synchronization signals. A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM among other examples) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively.

At UE 120, antennas 252a through 252r may receive the downlink signals from base station 110 or other base stations and may provide received signals to R demodulators (DEMODs) 254a through 254r, respectively. Each DEMOD 254 may condition (for example, filter, amplify, downconvert, and digitize) a received signal to obtain input samples. Each DEMOD 254 may further process the input samples (for example, for OFDM) to obtain received symbols. A MIMO detector 256 may obtain received symbols from all R DEMODs 254*a* through 254*r*, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. The term "controller/processor" may refer to one or more controllers, one or more processors, or a combination of one or more controllers and one or more processors. A channel processor may determine one or more of a reference signal received power (RSRP) parameter, a received signal strength indicator (RSSI) parameter, a reference signal received quality (RSRQ) parameter, or a channel quality indicator (CQI) parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (such as antennas 234*a* through 234*t* or antennas 252*a* through 252*r*) may include, or may be included within, one or more antenna panels, antenna groups, sets of antenna elements, or antenna arrays, among other examples. An antenna panel, an antenna group, a set of antenna elements, or an antenna array may include one or more antenna elements. An antenna panel, an antenna group, a set of antenna elements, or an antenna array may include a set of coplanar antenna elements or a set of non-coplanar antenna elements. An antenna panel, an antenna group, a set of antenna elements, or an antenna array may include antenna elements within a single housing or antenna elements within multiple housings. An antenna panel, an antenna group, a set of antenna elements, or an antenna array may include one or more antenna elements coupled to one or more transmission or reception components, such as one or more components of FIG. 2.

On the uplink, at UE 120, a transmit processor 264 may receive and process data from a data source 262 as well as control information (for example, for reports including RSRP, RSSI, RSRQ, or CQI) from controller/processor 280. Transmit processor 264 may also generate reference symbols for one or more reference signals. The symbols from transmit processor 264 may be precoded by a TX MIMO processor 266 if applicable, further processed by MODs 254*a* through 254*r* (for example, for discrete Fourier transform spread orthogonal frequency division multiplexing (DFT-s-OFDM) or orthogonal frequency division multiplexing (OFDM) with a cyclic prefix (CP) (CP-OFDM)), and transmitted to base station 110. In some aspects, a modulator and a demodulator (for example, MOD/DEMOD 254) of the UE 120 may be included in a modem of the UE 120. In some aspects, the UE 120 includes a transceiver. The transceiver may include any combination of antenna(s) 252, modulators 254, demodulators 254, MIMO detector 256, receive processor 258, transmit processor 264, or TX MIMO processor 266. The transceiver may be used by a processor (for example, controller/processor 280) and memory 282 to perform aspects of any of the methods described herein.

At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and uplink communications. In some aspects, a modulator and a demodulator (for example, MOD/DEMOD 232) of the base station 110 may be included in a modem of the base station 110. In some aspects, the base station 110 includes a transceiver. The transceiver may include any combination of antenna(s) 234, modulators 232, demodulators 232, MIMO detector 236, receive processor 238, transmit processor 220, or TX MIMO processor 230. The transceiver may be used by a processor (for example, controller/processor 240) and memory 242 to perform aspects of any of the methods described herein.

Controller/processor 240 of base station 110, controller/processor 280 of UE 120, or any other component(s) of FIG. 2 may perform one or more techniques associated with tone reservation signaling outside of an allocated bandwidth, as described in more detail elsewhere herein. For example, controller/processor 240 of base station 110, controller/processor 280 of UE 120, or any other component(s) of FIG. 2 may perform or direct operations of, for example, process 600 of FIG. 6, process 700 of FIG. 7, or other processes as described herein. Memories 242 and 282 may store data and program codes for base station 110 and UE 120, respectively. In some aspects, memory 242 or memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 600 of FIG. 6, process 700 of FIG. 7, or other processes as described herein. In some aspects, executing instructions may include running the instructions, converting the instructions, compiling the instructions, or interpreting the instructions, among other examples.

In some aspects, the UE includes means for receiving, from a base station, an indication to transmit tone reservation signaling, configured to reduce a peak-to-average-power-ratio for one or more of the UE or the base station, on one or more subcarriers outside of an allocated bandwidth that is allocated for an uplink communication scheduled for the UE; and/or means for transmitting, to the base station, signaling that includes the uplink communication within the allocated bandwidth and the tone reservation signaling on the one or more subcarriers. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for receiving, from a first UE, an indication of a channel response associated with a first uplink channel that has a bandwidth allocated to the first UE; and/or means for transmitting, to a second UE, an indication that one or more subcarriers, of the bandwidth allocated to the first UE, support transmission of tone reservation signaling by the second UE based at least in part on the indication of the channel response associated with the first uplink channel. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Figure 3:
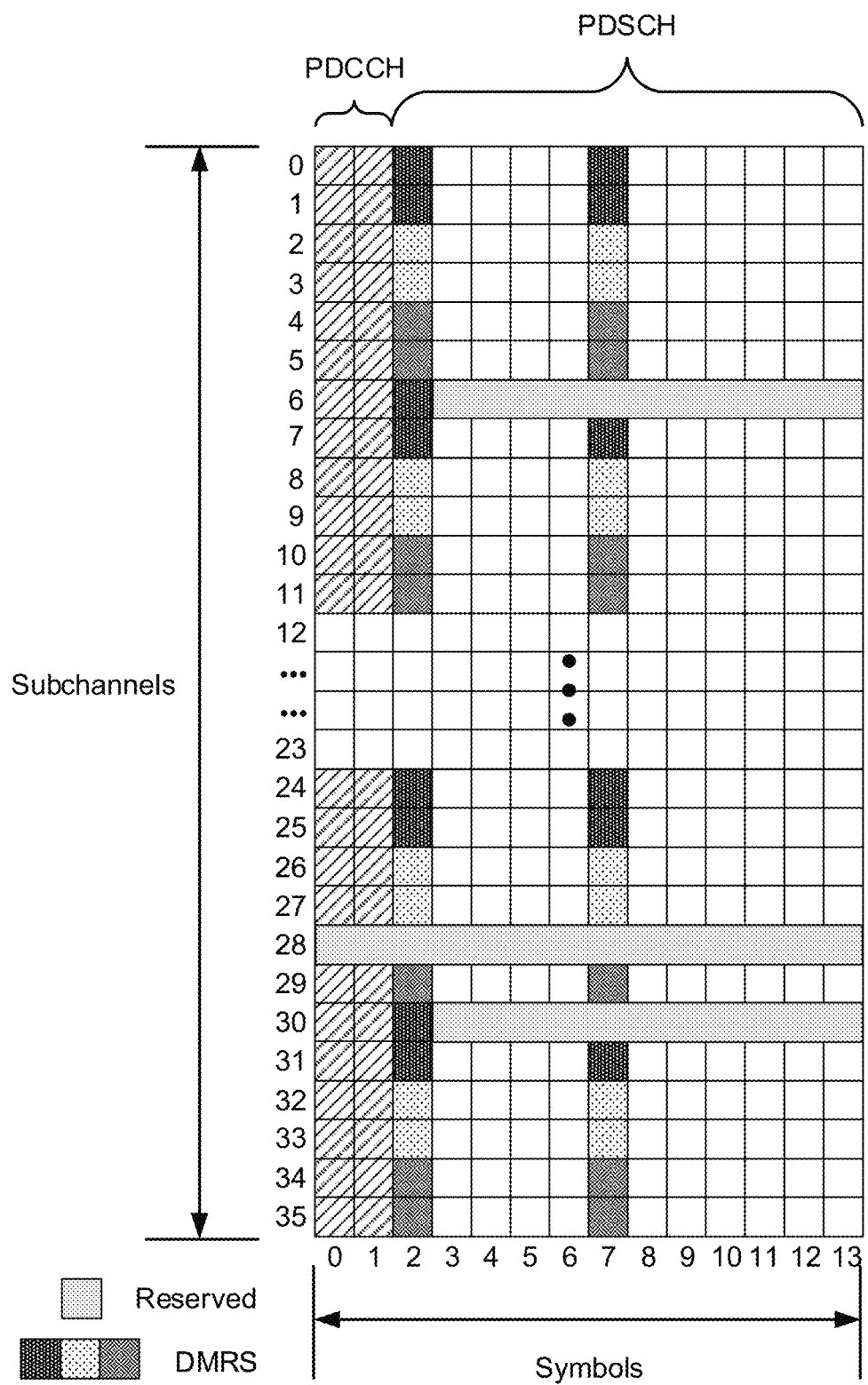
FIG. 3 is a diagram illustrating an example of UE subcarrier tone reservation on one or more subcarriers, in accordance with the present disclosure.

FIG. 3 is a diagram illustrating an example 300 of UE subcarrier tone reservation on one or more subcarriers, in accordance with the present disclosure. In some networks, a base station may transmit a downlink transmission on a physical downlink shared channel (PDSCH) with tone reservation on one or more subcarriers based at least in part on measurement(s) of uplink signals from a UE, a request from the UE, an indication of a capability of the UE, or an independent determination by the base station, among other examples (for example, as described herein).

In some aspects, the UE may be configured to communicate with the base station with a configuration for tone reservation. For example, the configuration may be common for multiple communications (for example, for a configured grant or semi-persistent scheduling resources), multiple UEs connected to the base station, a beam provided by the base station, a cell provided by the base station, or the like.

As shown by example 300, a PDSCH may include one or more reserved subcarriers (for example, tones) on which data or pilots are not to be transmitted. In some aspects, the subcarriers may be empty (for example, not having any information intended for transmission to the UE). Additionally, or alternatively, tone reservation may be applied to physical downlink control channel (PDCCH) symbols (for example, symbols 0 and 1 in FIG. 3). In some aspects, a pilot may include or may be a reference signal. In some aspects, the base station may transmit a signal that is configured to improve a PAPR for a downlink transmission on the PDSCH by using tone reservation to forgo transmission of data or pilots on the one or more reserved subcarriers. While example 300 provides an example of tone reservation applied to PDSCH or PDCCH, in some aspects (for example, when a UE applies tone reservation to uplink communications transmitted to a base station), tone reservation may be applied to physical uplink shared channel (PUSCH) or physical uplink control channel (PUCCH) symbols.

In a communication where tone reservation is not used, an increase in PAPR may occur, which may degrade communications between the base station and the UE, and may negatively affect an efficiency of power amplification at the base station. Based at least in part on degradation of the communications, the UE or the base station may consume power, communication, network, and computing resources to detect or correct communication errors associated with the degradation.

As indicated above, FIG. 3 is provided as an example. Other examples may differ from what is described with respect to FIG. 3.

In some aspects described herein a base station may receive signaling that indicates a channel response associated with a first uplink channel having a bandwidth allocated to a first UE. The base station may identify subcarriers for tone reservation in the bandwidth allocated to the first UE based at least in part on energies of the subcarriers associated with the channel response. The base station may transmit, to a second UE, an indication that the subcarriers support transmission of tone reservation signaling by the second UE. The second UE may transmit signaling to the base station, including an uplink communication within a bandwidth allocated to the second UE and the tone reservation signaling outside of the bandwidth allocated for the second UE.

In this way, the second UE may transmit tone reservation signaling on low energy subcarriers of the bandwidth allocated to the first UE, which may increase a received energy, as observed by the base station, on the low energy subcarriers. The increased energy on the low energy subcarriers may improve a PAPR of an uplink communication by the first UE using the bandwidth allocated to the first UE, which may reduce reception errors and computing, network, communication, and power resources consumed to detect and correct the reception errors.

Figure 4:
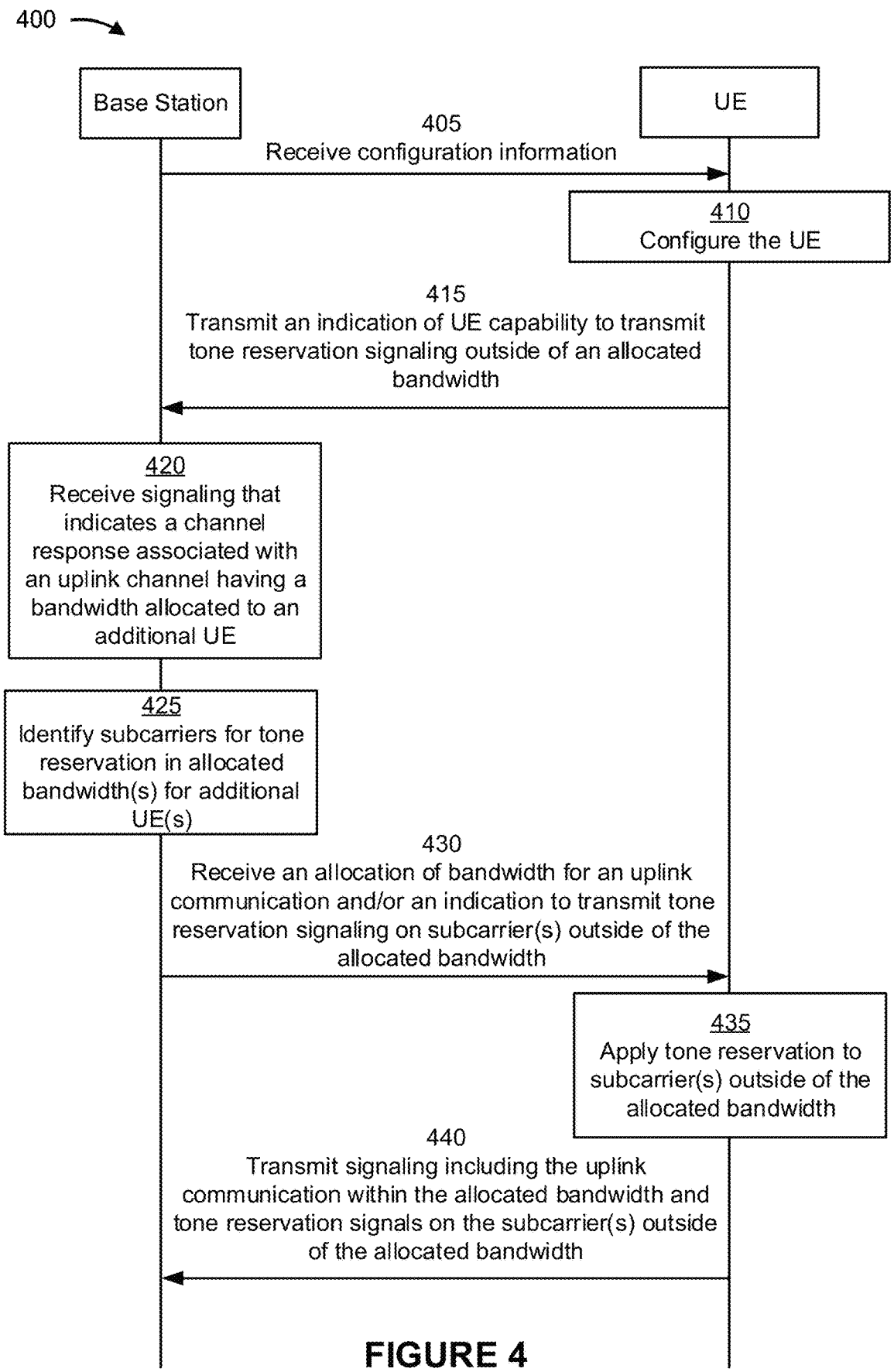
FIGS. 4 and 5 are diagrams illustrating examples associated with tone reservation signaling outside of an allocated bandwidth in accordance with the present disclosure.

FIG. 4 is a diagram illustrating an example 400 associated with tone reservation signaling outside of an allocated bandwidth, in accordance with the present disclosure. As shown in FIG. 4, a base station (for example, base station 110) may communicate with a UE (for example, UE 120). In some aspects, the base station and the UE may be part of a wireless network (for example, wireless network 100). As shown in FIG. 4, the UE may apply tone reservation for uplink communications. In some aspects, the base station may provide a cell of the wireless network to which the UE and multiple additional UEs are connected.

In a first operation 405, the base station may transmit, and the UE may receive, configuration information. In some aspects, the UE may receive the configuration information via one or more of radio resource control (RRC) signaling, medium access control (MAC) control elements (CEs) (MAC CEs), or downlink control information (DCI), among other examples. In some aspects, the configuration information may include an indication of one or more configuration parameters (for example, already known to the UE) for selection by the UE, or explicit configuration information for the UE to use to configure the UE, among other examples.

In some aspects, the configuration information may indicate that the UE is to transmit an indication of UE capability (for example, UE support) to transmit tone reservation signaling on subcarriers outside of an allocated bandwidth. In some aspects, the configuration information may indicate that the UE is to receive an indication to apply tone reservation signaling on subcarriers that are outside of an allocated bandwidth. In some aspects, the configuration information may indicate that the UE is to receive an indication to apply tone reservation signaling on subcarriers that are outside of an allocated bandwidth part (for example, a range of frequencies that include multiple bandwidths that can be allocated to additional UEs). In some aspects, the indication may include an indication of a number of subcarriers to which tone reservation is to be applied, a fraction of subcarriers to which tone reservation is to be applied, or a threshold power for subcarriers to which tone reservation is to be applied.

In a second operation 410, the UE may configure itself based at least in part on the configuration information. In some aspects, the UE may be configured to perform one or more operations described herein based at least in part on the configuration information.

In a third operation 415, the UE may transmit, and the base station may receive, an indication of a UE capability to transmit tone reservation signaling outside of an allocated bandwidth. For example, the UE may transmit the indication of the capability to transmit tone reservation signaling on the one or more subcarriers outside of the allocated bandwidth for an uplink communication that is scheduled for transmission by the UE. In some aspects, the UE capability may be based at least in part on the UE including components to transmit on multiple bandwidths, power resources of the UE satisfying a threshold, or availability of transmission components, among other examples.

In a fourth operation 420, the base station may receive signaling that indicates a channel response associated with an uplink channel having a bandwidth allocated to an additional UE. In some aspects, the base station may identify low energy subcarriers for each connected UE or for a subset of all connected UEs as subcarriers that are provisionally candidates for tone reservation from other UEs.

In a fifth operation 425, the base station may identify one or more subcarriers for tone reservation in one or more allocated bandwidths for one or more additional UEs. In some aspects, the base station may identify the one or more subcarriers based at least in part on energies of the one or more subcarriers as indicated via channel responses of the one or more additional UEs. The one or more subcarriers may be associated with one or more uplink channels of one or more additional UEs. For example, the one or more subcarriers may be expected to be received at the base station with lowest energies or capacities of the one or more uplink channels of the one or more additional UEs.

In some aspects, the one or more subcarriers may be parts of a same bandwidth part that is associated with uplink communications from the UE. For example, the one or more subcarriers may be within a configured set of bandwidths that can be allocated to UEs. In some aspects, the one or more subcarriers may be part of a different bandwidth part of a same frequency range (for example, FR2) as uplink communications from the UE. In some aspects, the one or more subcarriers may be part of a different frequency range from uplink communications from the UE.

In a sixth operation 430, the UE may receive, and the base station may transmit, an allocation of bandwidth for an uplink communication or an indication to transmit tone reservation signaling on one or more subcarriers outside of an allocated bandwidth. For example, the UE may receive an indication to transmit tone reservation signaling on one or more subcarriers outside of an allocated bandwidth that is allocated for an uplink communication scheduled for the UE. The UE may receive the indication via DCI, RRC signaling (for example, a configured grant), or MAC CE signaling. In some aspects, the base station may transmit the indication, to transmit tone reservation signaling outside of the allocated bandwidth, using compression. For example, the base station may use a lossless compression, such as Hoffman encoding.

In some aspects, the UE may receive the indication via a broadcast communication, such as a system information block (SIB). Based at least in part on using a broadcast communication to carry the indication, the base station and UE may conserve communication and/or network resources that may have otherwise been consumed to schedule, transmit, and receive a per-UE communication. In some aspects, the broadcast communication may indicate tone reservation locations on a bandwidth that includes frequencies allocated to multiple UEs (e.g., a full bandwidth supported for the base station for communication with multiple UEs). The broadcast communication may indicate energy limitations for individual subcarriers identified as tone reservation locations, or may indicate energy limitations for sets of subcarriers identified as tone reservation locations.

In some aspects, the indication to transmit tone reservation signaling on the one or more subcarriers outside of the allocated bandwidth may include an indication that the one or more subcarriers outside of the allocated bandwidth support tone reservation signaling. In some aspects, the indication to transmit the tone reservation signaling on the one or more subcarriers includes one or more resource elements or one or more subbands for transmitting the tone reservation signaling on the one or more subcarriers. In some aspects, the indication to transmit the tone reservation signaling on the one or more subcarriers may indicate one or more power parameters for transmitting the tone reservation signaling on the one or more subcarriers, such as a transmit power (for example, to maintain an energy gap between the one or more subcarriers and other subcarriers of a bandwidth that includes the one or more subcarriers) or a configuration of a signal for the tone reservation signaling. In some aspects, the one or more power parameters may be configured to improve performance of an additional UE having an additional bandwidth allocation for an additional uplink communication, with the additional bandwidth including the one or more subcarriers.

In a seventh operation 435, the UE may apply tone reservation to one or more subcarriers outside of the allocated bandwidth. In some aspects, the UE may determine to apply the tone reservation to the one or more subcarriers outside of the allocated bandwidth based at least in part on the UE having power resources that support the transmission of the one or more subcarriers outside of the allocated bandwidth.

In an eighth operation 440, the UE may transmit, and the base station may receive, signaling including the uplink communication within the allocated bandwidth and tone reservation signals on the one or more subcarriers outside of the allocated bandwidth. In some aspects, the UE may apply a mask to boost or de-boost signaling energy on the one or more subcarriers. In some aspects, the mask may be indicated by the base station.

In some aspects, the UE may transmit additional tone reservation signaling within the allocated bandwidth based at least in part on signaling received from a base station (for example, an indication that tone reservation is permitted or a request for tone reservation signaling within the allocated bandwidth). In some aspects, the indication to transmit the additional tone reservation signaling may be based at least in part on one or more downlink signals received from the base station (for example, to estimate a downlink channel with an assumption of uplink channel reciprocity), or a measurement report (for example, from the base station) indicating a channel response of an uplink channel associated with the uplink communication. In some aspects, an amount of tone reservation applied within the allocated bandwidth may be based at least in part on an indication from the base station, such as an indicated number of subcarriers to configure for tone reservation, an indicated percentage of subcarriers to configure for tone reservation, or an indicated energy threshold that delineates subcarriers for tone reservation and subcarriers for data of the uplink communication.

In some aspects, the base station may discard sampled signaling received on the one or more subcarriers allocated for tone reservation before decoding uplink communications that include an allocation of bandwidth that includes the one or more subcarriers.

In some aspects, the base station may coordinate with other base stations to provide tone reservation signaling on downlink communications of the other base stations having low energy subcarriers. In some aspects, the one or more base station may indicate to the base station that the one low energy subcarriers support tone reservation signaling by the base station. In some aspects, the one or more base station may indicate one or more transmission parameters for the tone reservation signaling to reduce a likelihood of damaging (for example, via increasing noise) the downlink communications.

Figure 5:
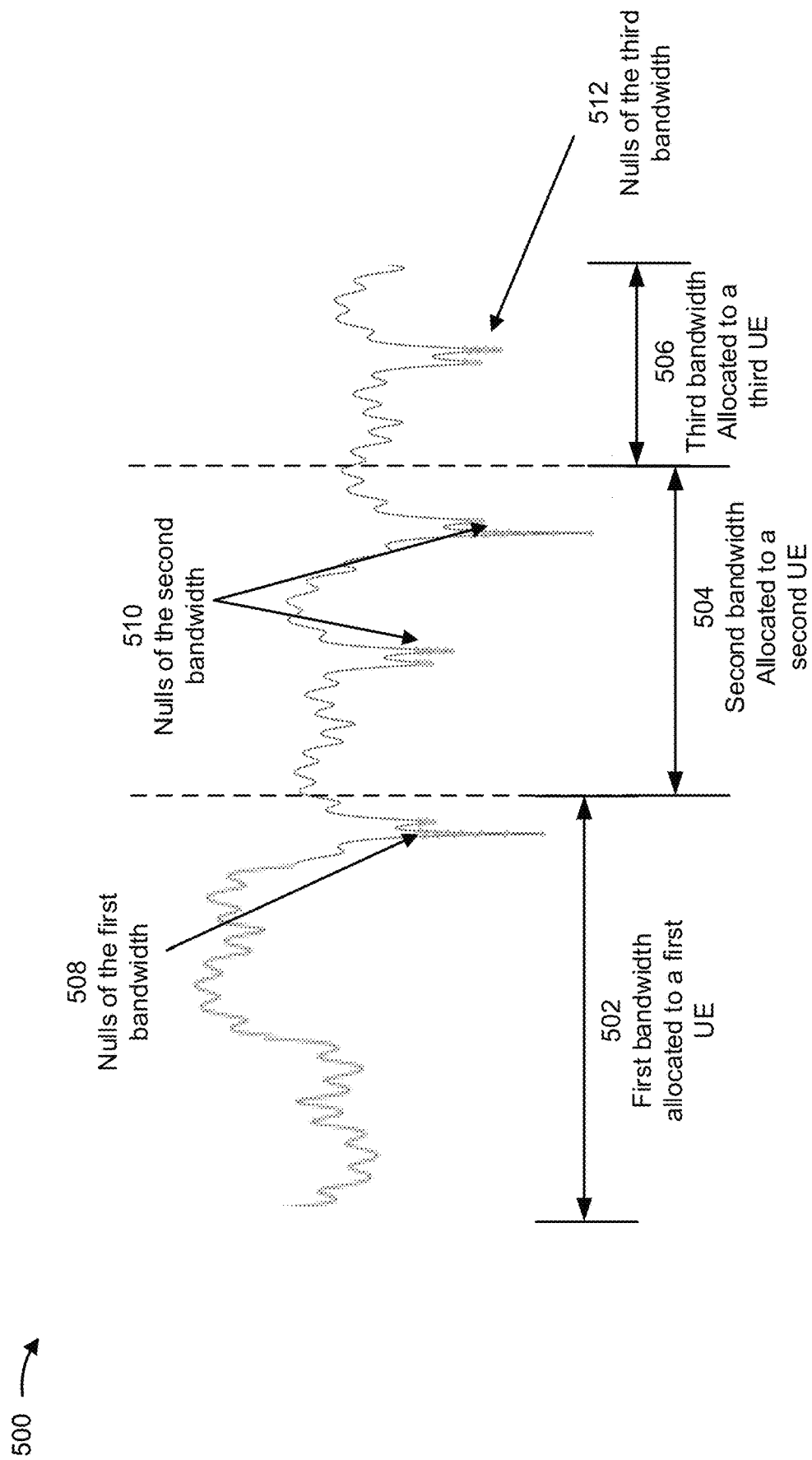

FIG. 5 is a diagram illustrating an example 500 associated with tone reservation signaling outside of an allocated bandwidth, in accordance with the present disclosure. As shown in FIG. 5, a base station (for example, base station 110) may communicate with multiple UEs (for example, UEs 120). In some aspects, the base station and the multiple UEs may be part of a wireless network (for example, wireless network 100). As shown in FIG. 5, the multiple UEs may apply tone reservation for uplink communications outside of allocated bandwidths.

The base station may configure a first bandwidth 502 allocated to a first UE, a second bandwidth 504 allocated to a second UE, and a third bandwidth 506 allocated to a third UE. The base station may obtain a channel response for uplink channels associated with the first bandwidth 502, the second bandwidth 504, and the third bandwidth 506 via measuring uplink reference signals, among other examples.

The base station may identify nulls 508 (e.g., local minima in an energy domain) of the first bandwidth, nulls 510 of the second bandwidth, and nulls 512 of the third bandwidth. The base station may determine to use the nulls for tone reservation signaling from other UEs. The base station may indicate to the other UEs to transmit tone reservation signaling on the nulls of a different UE. For example, the base station may indicate to the second UE or the third UE to transmit tone reservation signaling on the nulls 508, to the first UE or to the third UE to transmit tone reservation signaling on the nulls 510, or to the first UE or to the second UE to transmit tone reservation signaling on the nulls 512.

Figure 6:
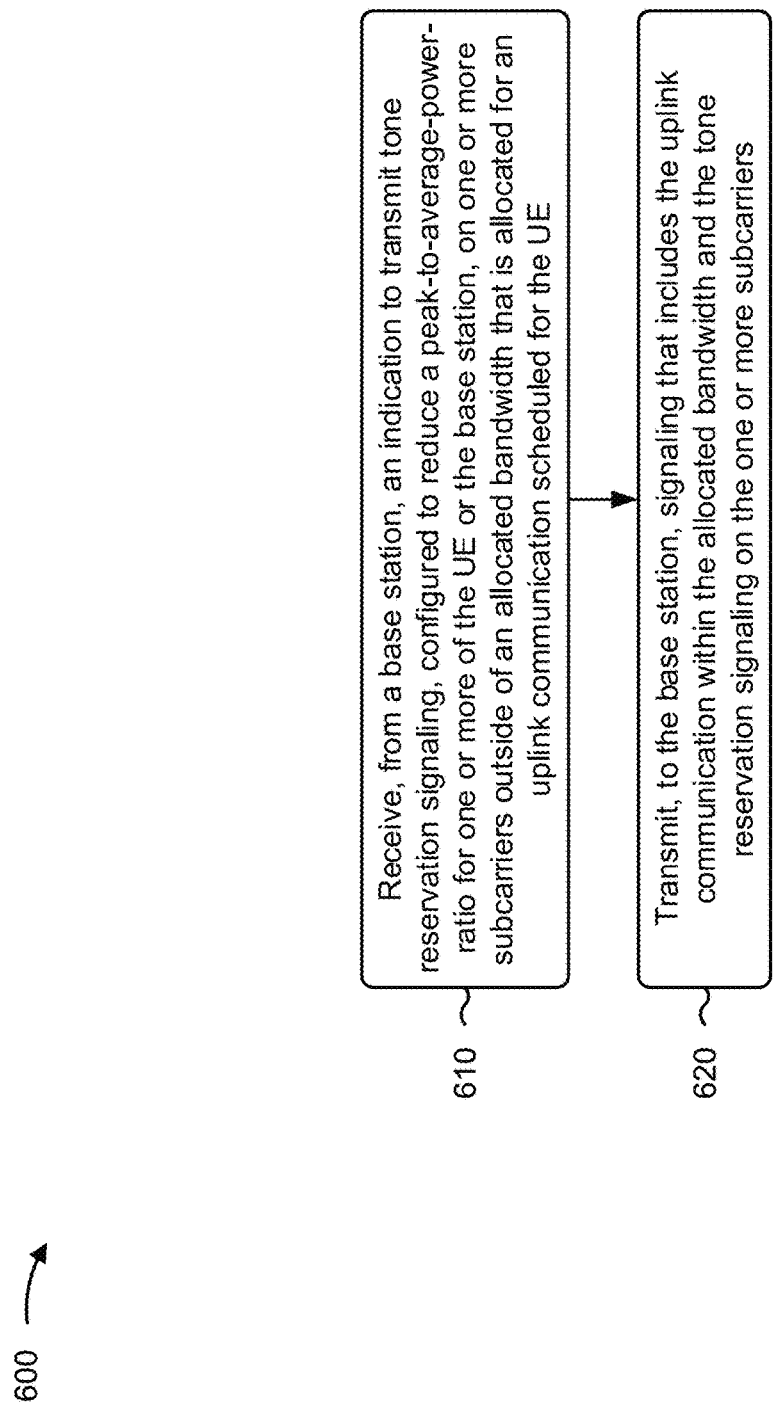
FIG. 6 is a flowchart illustrating an example process performed, for example, by a UE, that supports tone reservation signaling outside of an allocated bandwidth in accordance with the present disclosure.

FIG. 6 is a flowchart illustrating an example process 600 performed, for example, by a UE in accordance with the present disclosure. Example process 600 is an example where the UE (for example, UE 120) performs operations associated with tone reservation signaling outside of an allocated bandwidth.

As shown in FIG. 6, in some aspects, process 600 may include receiving, from a base station, an indication to transmit tone reservation signaling, configured to reduce a peak-to-average-power-ratio for one or more of the UE or the base station, on one or more subcarriers outside of an allocated bandwidth that is allocated for an uplink communication scheduled for the UE (block 610). For example, the UE (such as by using communication manager 140 or reception component 802, depicted in FIG. 8) may receive, from a base station, an indication to transmit tone reservation signaling, configured to reduce a peak-to-average-power-ratio for one or more of the UE or the base station, on one or more subcarriers outside of an allocated bandwidth that is allocated for an uplink communication scheduled for the UE, as described above.

As further shown in FIG. 6, in some aspects, process 600 may include transmitting, to the base station, signaling that includes the uplink communication within the allocated bandwidth and the tone reservation signaling on the one or more subcarriers (block 620). For example, the UE (such as by using communication manager 140 or transmission component 804, depicted in FIG. 8) may transmit, to the base station, signaling that includes the uplink communication within the allocated bandwidth and the tone reservation signaling on the one or more subcarriers, as described above.

Process 600 may include additional aspects, such as any single aspect or any combination of aspects described below or in connection with one or more other processes described elsewhere herein.

In a first additional aspect, process 600 includes transmitting an indication of a capability to transmit tone reservation signaling on the one or more subcarriers outside of the allocated bandwidth that is allocated for the uplink communication.

In a second additional aspect, alone or in combination with the first aspect, the one or more subcarriers are associated with an uplink channel of an additional UE.

In a third additional aspect, alone or in combination with one or more of the first and second aspects, the one or more subcarriers are expected to be received, at a base station, with lowest energies of subcarriers of the uplink channel of the additional UE.

In a fourth additional aspect, alone or in combination with one or more of the first through third aspects, the one or more subcarriers are part of a bandwidth part associated with the uplink communication, and wherein the bandwidth part includes the allocated bandwidth.

In a fifth additional aspect, alone or in combination with one or more of the first through fourth aspects, the indication to transmit the tone reservation signaling on the one or more subcarriers comprises one or more indications of one or more resource elements for transmitting the tone reservation signaling on the one or more subcarriers, one or more subbands for transmitting the tone reservation signaling on the one or more subcarriers, or one or more power parameters for transmitting the tone reservation signaling on the one or more subcarriers.

In a sixth additional aspect, alone or in combination with one or more of the first through fifth aspects, process 600 includes transmitting additional tone reservation signaling within the allocated bandwidth based at least in part on signaling received from a base station.

In a seventh additional aspect, alone or in combination with one or more of the first through sixth aspects, the signaling received from the base station comprises an indication to transmit the additional tone reservation signaling based at least in part on or more of one or more downlink signals received from the base station, or an indication of a channel response of an uplink channel associated with the uplink communication.

Although FIG. 6 shows example blocks of process 600, in some aspects, process 600 may include additional blocks, fewer blocks, different blocks, or differently arranged blocks than those depicted in FIG. 6. Additionally or alternatively, two or more of the blocks of process 600 may be performed in parallel.

Figure 7:
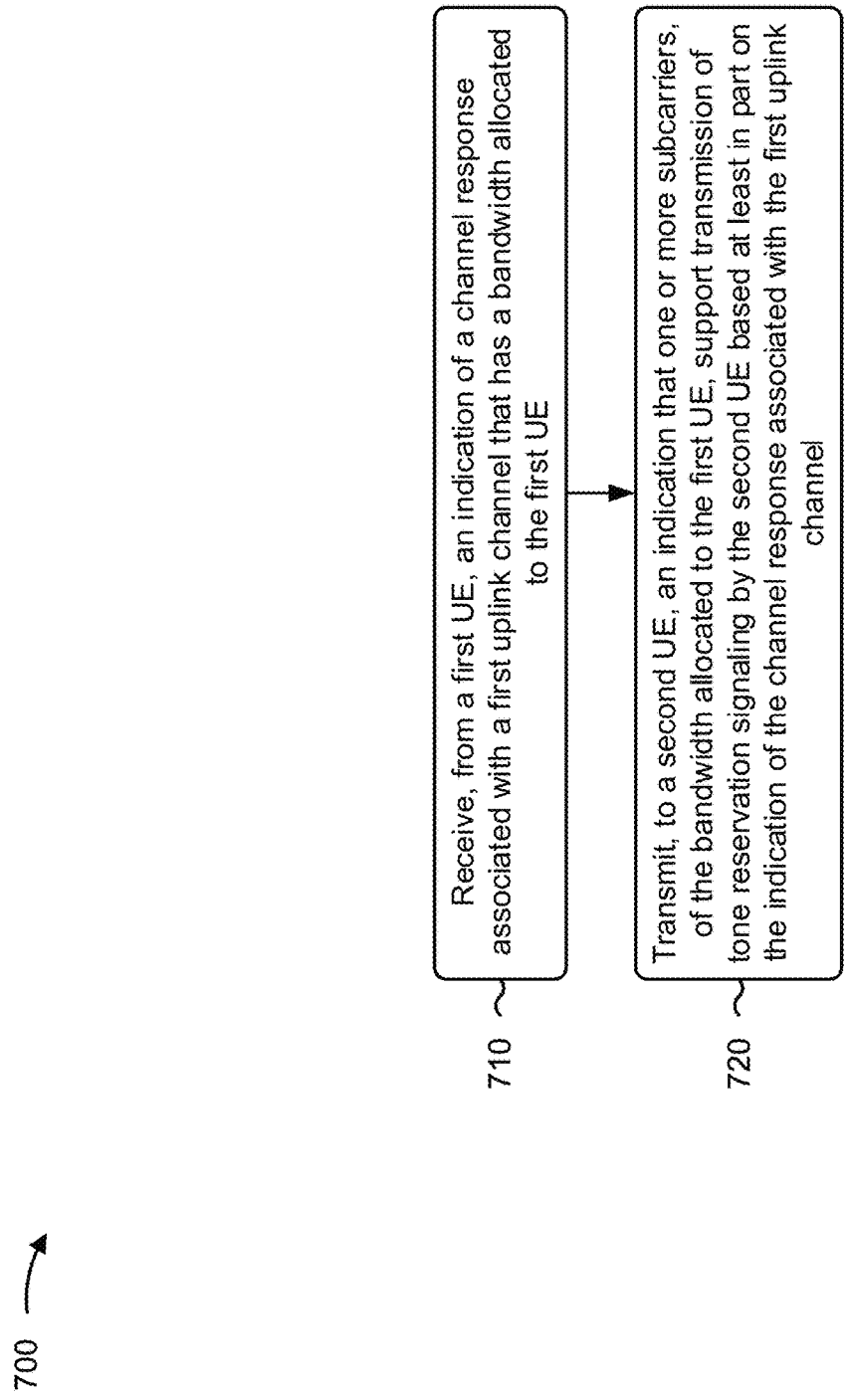
FIG. 7 is a flowchart illustrating an example process performed, for example, by a base station, that supports tone reservation signaling outside of an allocated bandwidth in accordance with the present disclosure.

FIG. 7 is a flowchart illustrating an example process 700 performed, for example, by a base station in accordance with the present disclosure. Example process 700 is an example where the base station (for example, base station 110) performs operations associated with tone reservation signaling outside of an allocated bandwidth.

As shown in FIG. 7, in some aspects, process 700 may include receiving, from a first UE, an indication of a channel response associated with a first uplink channel that has a bandwidth allocated to the first UE (block 710). For example, the base station (such as by using communication manager 150 or reception component 902, depicted in FIG. 9) may receive, from a first UE, an indication of a channel response associated with a first uplink channel that has a bandwidth allocated to the first UE, as described above.

As further shown in FIG. 7, in some aspects, process 700 may include transmitting, to a second UE, an indication that one or more subcarriers, of the bandwidth allocated to the first UE, support transmission of tone reservation signaling by the second UE based at least in part on the indication of the channel response associated with the first uplink channel (block 720). For example, the base station (such as by using communication manager 150 or transmission component 904, depicted in FIG. 9) may transmit, to a second UE, an indication that one or more subcarriers, of the bandwidth allocated to the first UE, support transmission of tone reservation signaling by the second UE based at least in part on the indication of the channel response associated with the first uplink channel, as described above.

Process 700 may include additional aspects, such as any single aspect or any combination of aspects described below or in connection with one or more other processes described elsewhere herein.

In a first additional aspect, the indication that the one or more subcarriers of the bandwidth allocated to the first UE support transmission of tone reservation signaling by the second UE comprises an indication to transmit tone reservation signaling on the one or more subcarriers outside of an allocated bandwidth that is allocated for an uplink communication scheduled for the second UE.

In a second additional aspect, alone or in combination with the first aspect, the indication to transmit the tone reservation signaling on the one or more subcarriers comprises one or more indications of one or more resource elements for transmitting the tone reservation signaling on the one or more subcarriers, one or more subbands for transmitting the tone reservation signaling on the one or more subcarriers, or one or more power parameters for transmitting the tone reservation signaling on the one or more subcarriers.

In a third additional aspect, alone or in combination with one or more of the first and second aspects, process 700 includes receiving, from the second UE, an indication of a capability to transmit tone reservation signaling on the one or more subcarriers outside of an allocated bandwidth that is allocated for an uplink communication scheduled for the second UE.

In a fourth additional aspect, alone or in combination with one or more of the first through third aspects, the one or more subcarriers are expected to be received at the base station with lowest energies of subcarriers of the uplink channel.

In a fifth additional aspect, alone or in combination with one or more of the first through fourth aspects, the one or more subcarriers are part of a bandwidth part having an allocated bandwidth that is allocated for an uplink communication scheduled for the second UE, and wherein the bandwidth part includes the allocated bandwidth.

In a sixth additional aspect, alone or in combination with one or more of the first through fifth aspects, process 700 includes receiving additional tone reservation signaling within an allocated bandwidth that is allocated for an uplink communication scheduled for the second UE.

Although FIG. 7 shows example blocks of process 700, in some aspects, process 700 may include additional blocks, fewer blocks, different blocks, or differently arranged blocks than those depicted in FIG. 7. Additionally or alternatively, two or more of the blocks of process 700 may be performed in parallel.

Figure 8:
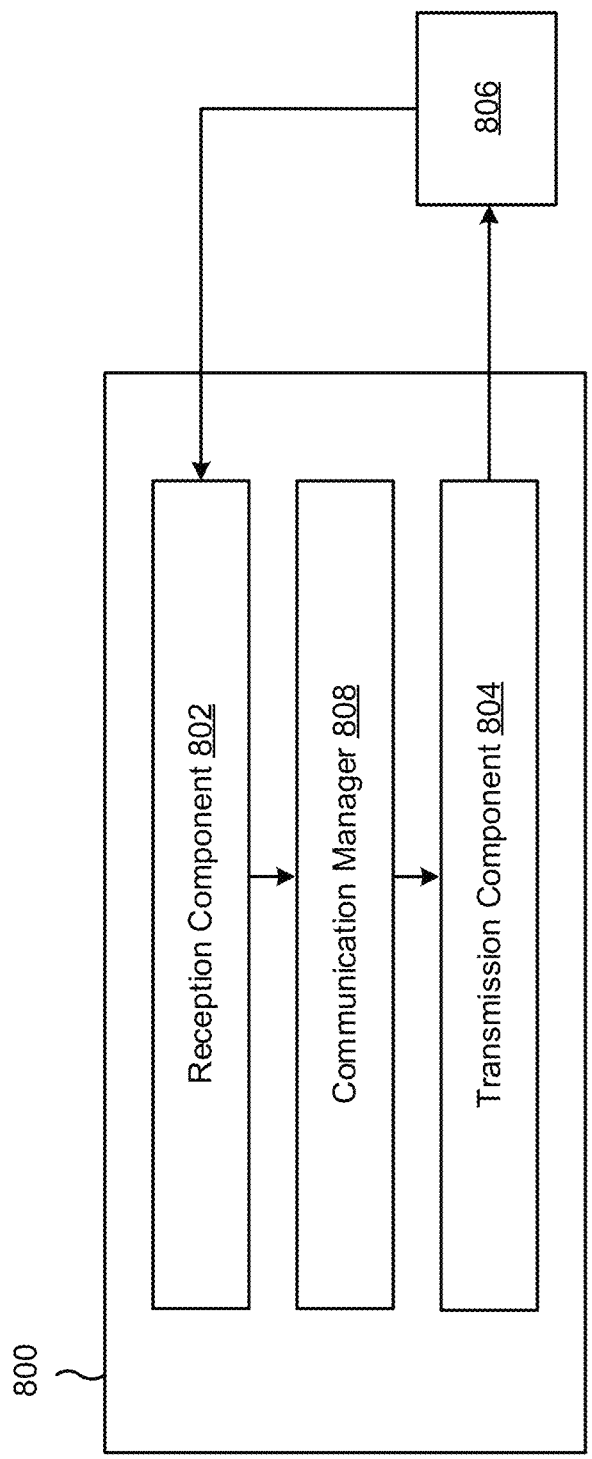
FIGS. 8 and 9 are block diagrams of example apparatuses for wireless communication that support tone reservation signaling outside of an allocated bandwidth in accordance with the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses or one or more other components). As shown, the apparatus 800 may communicate with another apparatus 806 (such as a UE, a base station, or another wireless communication device) using the reception component 802 and the transmission component 804. As further shown, the apparatus 800 may include a communication manager 808 (for example, the communication manager 140).

In some aspects, the apparatus 800 may be configured to perform one or more operations described herein in connection with FIGS. 4 and 5. Additionally, or alternatively, the apparatus 800 may be configured to perform one or more processes described herein, such as process 600 of FIG. 6. In some aspects, the apparatus 800 or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive, from a base station, an indication to transmit tone reservation signaling, configured to reduce a peak-to-average-power-ratio for one or more of the UE or the base station, on one or more subcarriers outside of an allocated bandwidth that is allocated for an uplink communication scheduled for the UE. The transmission component 804 may transmit, to the base station, signaling that includes the uplink communication within the allocated bandwidth and the tone reservation signaling on the one or more subcarriers.

The transmission component 804 may transmit an indication of a capability to transmit tone reservation signaling on the one or more subcarriers outside of the allocated bandwidth that is allocated for the uplink communication.

The transmission component 804 may transmit additional tone reservation signaling within the allocated bandwidth based at least in part on signaling received from a base station.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
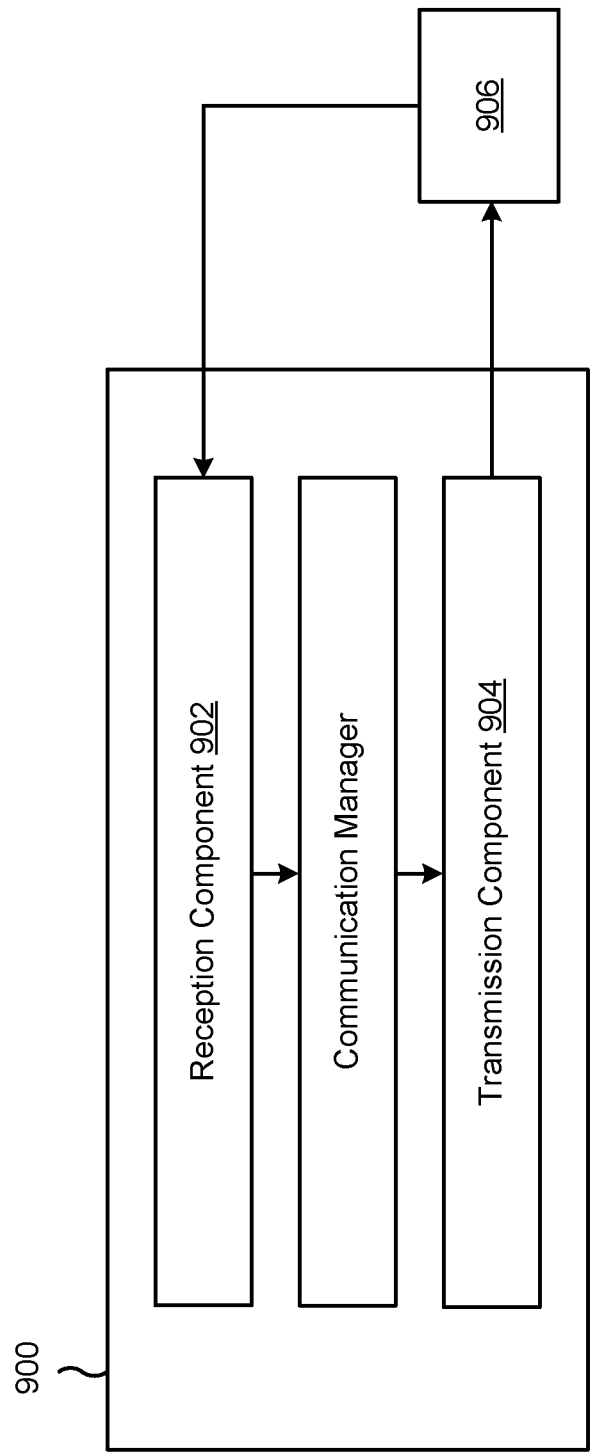

FIG. 9 is a block diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses or one or more other components). As shown, the apparatus 900 may communicate with another apparatus 906 (such as a UE, a base station, or another wireless communication device) using the reception component 902 and the transmission component 904. As further shown, the apparatus 900 may include a communication manager (for example, the communication manager 150).

In some aspects, the apparatus 900 may be configured to perform one or more operations described herein in connection with FIGS. 4 and 5. Additionally, or alternatively, the apparatus 900 may be configured to perform one or more processes described herein, such as process 700 of FIG. 7. In some aspects, the apparatus 900 or one or more components shown in FIG. 9 may include one or more components of the base station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the base station described in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described in connection with FIG. 2. In some aspects, the transmission component 904 may be co-located with the reception component 902 in a transceiver.

The reception component 902 may receive, from a first UE, an indication of a channel response associated with a first uplink channel that has a bandwidth allocated to the first UE. The transmission component 904 may transmit, to a second UE, an indication that one or more subcarriers, of the bandwidth allocated to the first UE, support transmission of tone reservation signaling by the second UE based at least in part on the indication of the channel response associated with the first uplink channel.

The reception component 902 may receive, from the second UE, an indication of a capability to transmit tone reservation signaling on the one or more subcarriers outside of an allocated bandwidth that is allocated for an uplink communication scheduled for the second UE.

The reception component 902 may receive (e.g., from the second UE) additional tone reservation signaling within an allocated bandwidth that is allocated for an uplink communication scheduled for the second UE.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving, from a base station, an indication to transmit tone reservation signaling, configured to reduce a peak-to-average-power-ratio for one or more of the UE or the base station, on one or more subcarriers outside of an allocated bandwidth that is allocated for an uplink communication scheduled for the UE; and transmitting, to the base station, signaling that includes the uplink communication within the allocated bandwidth and the tone reservation signaling on the one or more subcarriers.

Aspect 2: The method of Aspect 1, further comprising: transmitting an indication of a capability to transmit tone reservation signaling on the one or more subcarriers outside of the allocated bandwidth that is allocated for the uplink communication.

Aspect 3: The method of any of Aspects 1-2, wherein the one or more subcarriers are associated with an uplink channel of an additional UE.

Aspect 4: The method of Aspect 3, wherein the one or more subcarriers are expected to be received, at a base station, with lowest energies of subcarriers of the uplink channel of the additional UE.

Aspect 5: The method of any of Aspects 1-4, wherein the one or more subcarriers are part of a bandwidth part associated with the uplink communication, and wherein the bandwidth part includes the allocated bandwidth.

Aspect 6: The method of any of Aspects 1-5, wherein the indication to transmit the tone reservation signaling on the one or more subcarriers comprises one or more indications of: one or more resource elements for transmitting the tone reservation signaling on the one or more subcarriers, one or more subbands for transmitting the tone reservation signaling on the one or more subcarriers, or one or more power parameters for transmitting the tone reservation signaling on the one or more subcarriers.

Aspect 7: The method of any of Aspects 1-6, further comprising: transmitting additional tone reservation signaling within the allocated bandwidth based at least in part on signaling received from a base station.

Aspect 8: The method of Aspect 7, wherein the signaling received from the base station comprises: an indication to transmit the additional tone reservation signaling based at least in part on or more of: one or more downlink signals received from the base station, or an indication of a channel response of an uplink channel associated with the uplink communication.

Aspect 9: A method of wireless communication performed by a base station, comprising: receiving, from a first user equipment (UE), an indication of a channel response associated with a first uplink channel that has a bandwidth allocated to the first UE; and transmitting, to a second UE, an indication that one or more subcarriers, of the bandwidth allocated to the first UE, support transmission of tone reservation signaling by the second UE based at least in part on the indication of the channel response associated with the first uplink channel.

Aspect 10: The method of Aspect 9, wherein the indication that the one or more subcarriers of the bandwidth allocated to the first UE support transmission of tone reservation signaling by the second UE comprises: an indication to transmit tone reservation signaling on the one or more subcarriers outside of an allocated bandwidth that is allocated for an uplink communication scheduled for the second UE.

Aspect 11: The method of Aspect 10, wherein the indication to transmit the tone reservation signaling on the one or more subcarriers comprises one or more indications of: one or more resource elements for transmitting the tone reservation signaling on the one or more subcarriers, one or more subbands for transmitting the tone reservation signaling on the one or more subcarriers, or one or more power parameters for transmitting the tone reservation signaling on the one or more subcarriers.

Aspect 12: The method of any of Aspects 9-11, further comprising: receiving, from the second UE, an indication of a capability to transmit tone reservation signaling on the one or more subcarriers outside of an allocated bandwidth that is allocated for an uplink communication scheduled for the second UE.

Aspect 13: The method of any of Aspects 9-12, wherein the one or more subcarriers are expected to be received at the base station with lowest energies of subcarriers of the uplink channel.

Aspect 14: The method of any of Aspects 9-13, wherein the one or more subcarriers are part of a bandwidth part having an allocated bandwidth that is allocated for an uplink communication scheduled for the second UE, and wherein the bandwidth part includes the allocated bandwidth.

Aspect 15: The method of any of Aspects 9-14, further comprising: receiving additional tone reservation signaling within an allocated bandwidth that is allocated for an uplink communication scheduled for the second UE.

Aspect 16: An apparatus for wireless communication at a device, comprising a processor; memory coupled with the processor; and instructions stored in the memory and executable by the processor to cause the apparatus to perform the method of one or more of Aspects 1-15.

Aspect 17: A device for wireless communication, comprising a memory and one or more processors coupled to the memory, the one or more processors configured to perform the method of one or more of Aspects 1-15.

Aspect 18: An apparatus for wireless communication, comprising at least one means for performing the method of one or more of Aspects 1-15.

Aspect 19: A non-transitory computer-readable medium storing code for wireless communication, the code comprising instructions executable by a processor to perform the method of one or more of Aspects 1-15.

Aspect 20: A non-transitory computer-readable medium storing a set of instructions for wireless communication, the set of instructions comprising one or more instructions that, when executed by one or more processors of a device, cause the device to perform the method of one or more of Aspects 1-15.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A method of wireless communication performed by a user equipment (UE), comprising:
   receiving an indication to transmit tone reservation signaling, configured to reduce a peak-to-average-power-ratio for one or more of the UE or a network entity, on one or more subcarriers of an uplink channel of an additional UE, the one or more subcarriers being associated with lowest energies of subcarriers of the uplink channel of the additional UE; and
   transmitting signaling that includes the tone reservation signaling on the one or more subcarriers of the uplink channel of the additional UE and an uplink communication scheduled for the UE within an allocated bandwidth that is allocated for the uplink communication.

2. The method of claim 1, further comprising:
   transmitting an indication of a capability to transmit tone reservation signaling on the one or more subcarriers outside of the allocated bandwidth that is allocated for the uplink communication.

3. The method of claim 1, wherein the one or more subcarriers are expected to be received with the lowest energies of the subcarriers of the uplink channel of the additional UE.

4. The method of claim 1, wherein the one or more subcarriers are part of a bandwidth part associated with the uplink communication, and
wherein the bandwidth part includes the allocated bandwidth.

5. The method of claim 1, wherein the indication to transmit the tone reservation signaling on the one or more subcarriers comprises one or more indications of:
   one or more resource elements for transmitting the tone reservation signaling on the one or more subcarriers,
   one or more subbands for transmitting the tone reservation signaling on the one or more subcarriers, or
   one or more power parameters for transmitting the tone reservation signaling on the one or more subcarriers.

6. The method of claim 1, further comprising:
   transmitting additional tone reservation signaling within the allocated bandwidth based at least in part on signaling received from a network entity.

7. The method of claim 6, wherein the signaling received from the network entity comprises:
   an indication to transmit the additional tone reservation signaling based at least in part on or more of:
      one or more downlink signals received from the network entity, or
      an indication of a channel response of an uplink channel associated with the uplink communication.

8. The method of claim 1, wherein the one or more subcarriers are outside of the allocated bandwidth that is allocated for the uplink communication.

9. A method of wireless communication performed by a network entity, comprising:
   receiving an indication of a channel response associated with a first uplink channel that has a bandwidth allocated to a first user equipment (UE); and
   transmitting, fora second UE, an indication that one or more subcarriers, of the bandwidth allocated to the first UE, support transmission of tone reservation signaling by the second UE based at least in part on the indication of the channel response associated with the first uplink channel, the one or more subcarriers being associated with lowest energies of subcarriers of the first uplink channel allocated to the first UE.

10. The method of claim 9, wherein the indication to transmit the tone reservation signaling on the one or more subcarriers comprises one or more indications of:
   one or more resource elements for transmitting the tone reservation signaling on the one or more subcarriers,
   one or more subbands for transmitting the tone reservation signaling on the one or more subcarriers, or
   one or more power parameters for transmitting the tone reservation signaling on the one or more subcarriers.

11. The method of claim 9, further comprising:
   receiving, from the second UE, an indication of a capability to transmit tone reservation signaling on the one or more subcarriers of the bandwidth allocated to the first UE.

12. The method of claim 9, wherein the one or more subcarriers are expected to be received with the lowest energies of the subcarriers of the first uplink channel.

13. The method of claim 9, wherein the one or more subcarriers are part of a bandwidth part having an allocated bandwidth that is allocated for an uplink communication scheduled for the second UE, and
wherein the bandwidth part includes the allocated bandwidth.

14. The method of claim 9, further comprising:
   receiving additional tone reservation signaling within an allocated bandwidth that is allocated for an uplink communication scheduled for the second UE.

15. The method of claim 14, wherein receiving the additional tone reservation is based at least in part on signaling transmitted by the network entity.

16. The method of claim 9, wherein the one or more subcarriers are outside of an allocated bandwidth that is allocated for an uplink communication scheduled for the second UE.

17. A user equipment (UE) for wireless communication, comprising:
a memory; and
one or more processors, coupled to the memory, configured to:
receive an indication to transmit tone reservation signaling, configured to reduce a peak-to-average-power-ratio for one or more of the UE or a network entity, on one or more subcarriers of an uplink channel of an additional UE, the one or more subcarriers being associated with lowest energies of subcarriers of the uplink channel of the additional UE; and
transmit signaling that includes the tone reservation signaling on the one or more subcarriers of the uplink channel of the additional UE and an uplink communication scheduled for the UE within an allocated bandwidth that is allocated for the uplink communication.

18. The UE of claim 17, wherein the one or more processors are further configured to:
transmit an indication of a capability to transmit tone reservation signaling on the one or more subcarriers outside of the allocated bandwidth that is allocated for the uplink communication.

19. The UE of claim 17, wherein the one or more subcarriers are expected to be received with the lowest energies of the subcarriers of the uplink channel of the additional UE.

20. The UE of claim 17, wherein the one or more subcarriers are part of a bandwidth part associated with the uplink communication, and
wherein the bandwidth part includes the allocated bandwidth.

21. The UE of claim 17, wherein the indication to transmit the tone reservation signaling on the one or more subcarriers comprises one or more indications of:
one or more resource elements for transmitting the tone reservation signaling on the one or more subcarriers,
one or more subbands for transmitting the tone reservation signaling on the one or more subcarriers, or
one or more power parameters for transmitting the tone reservation signaling on the one or more subcarriers.

22. The UE of claim 17, wherein the one or more processors are further configured to:
transmit additional tone reservation signaling within the allocated bandwidth based at least in part on signaling received from a network entity.

23. The UE of claim 22, wherein the signaling received from the network entity comprises:
an indication to transmit the additional tone reservation signaling based at least in part on or more of:
one or more downlink signals received from the network entity, or
an indication of a channel response of an uplink channel associated with the uplink communication.

24. A network entity for wireless communication, comprising:
a memory; and
one or more processors, coupled to the memory, configured to:
receive an indication of a channel response associated with a first uplink channel having a bandwidth allocated to a first user equipment (UE); and
transmit, fora second UE, an indication that one or more subcarriers, of the bandwidth allocated to the first UE, support transmission of tone reservation signaling by the second UE based at least in part on the indication of the channel response associated with the first uplink channel, the one or more subcarriers being associated with lowest energies of subcarriers of the first uplink channel allocated to the first UE.

25. The network entity of claim 24, wherein the indication to transmit the tone reservation signaling on the one or more subcarriers comprises one or more indications of:
one or more resource elements for transmitting the tone reservation signaling on the one or more subcarriers,
one or more subbands for transmitting the tone reservation signaling on the one or more subcarriers, or
one or more power parameters for transmitting the tone reservation signaling on the one or more subcarriers.

26. The network entity of claim 24, wherein the one or more processors are further configured to:
receive, from the second UE, an indication of a capability to transmit tone reservation signaling on the one or more subcarriers of the bandwidth allocated to the first UE.

27. The network entity of claim 24, wherein the one or more subcarriers are expected to be received with the lowest energies of the subcarriers of the first uplink channel.

28. The network entity of claim 24, wherein the one or more subcarriers are part of a bandwidth part having an allocated bandwidth that is allocated for an uplink communication scheduled for the second UE, and
wherein the bandwidth part includes the allocated bandwidth.

29. The network entity of claim 24, wherein the one or more processors are further configured to:
receive additional tone reservation signaling within an allocated bandwidth that is allocated for an uplink communication scheduled for the second UE.

30. The network entity of claim 29, wherein receiving the additional tone reservation is based at least in part on signaling transmitted by the network entity.

* * * * *